No. 762,372. PATENTED JUNE 14, 1904.
H. P. ADAMS.
AGRICULTURAL IMPLEMENT.
APPLICATION FILED DEC. 7, 1903.
NO MODEL.
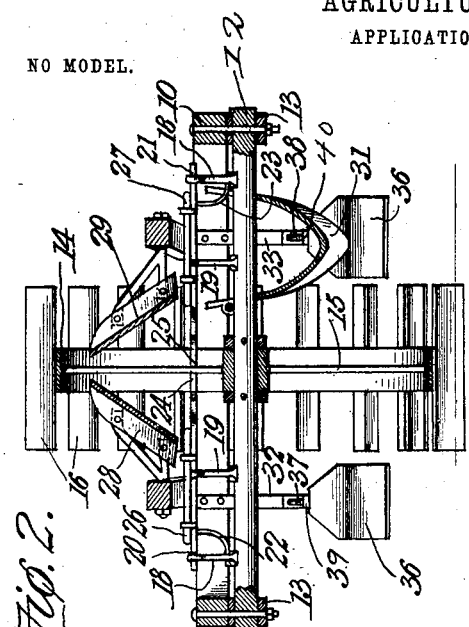
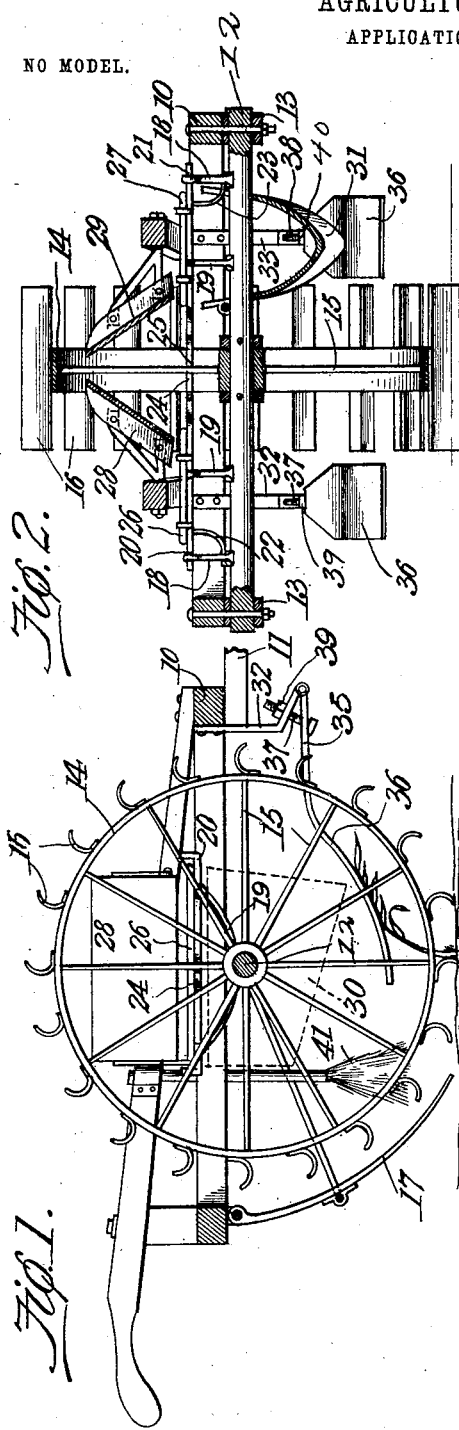
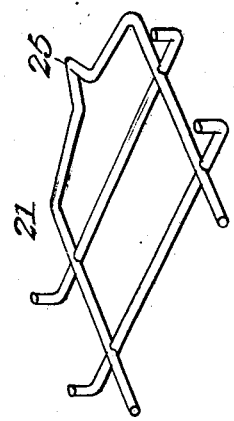
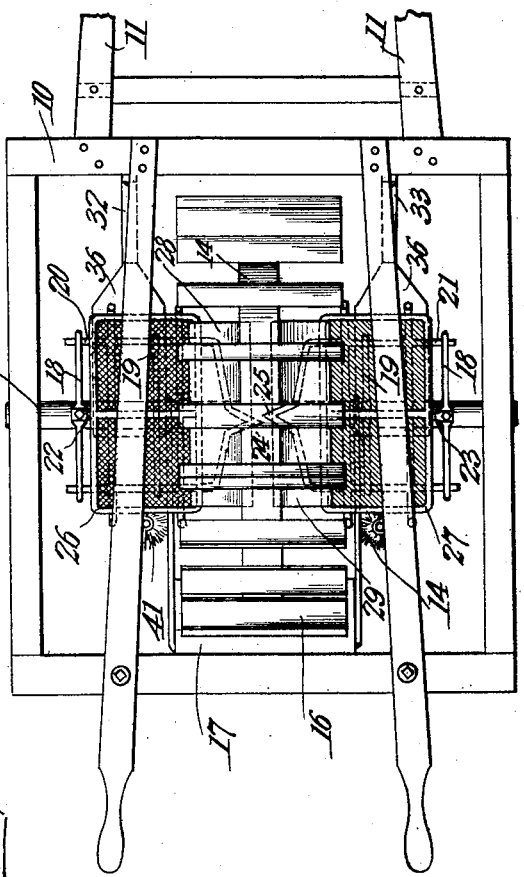
Witnesses
E. F. Stewart
E. N. Woodward.
Henry P. Adams
Inventor
by C. A. Snow & Co.
Attorneys No. 762,372.

Patented June 14, 1904.

UNITED STATES PATENT OFFICE.

HENRY P. ADAMS, OF SALEM, OHIO.

AGRICULTURAL IMPLEMENT.

SPECIFICATION forming part of Letters Patent No. 762,372, dated June 14, 1904.

Application filed December 7, 1903. Serial No. 184,156. (No model.)

*To all whom it may concern:*

Be it known that I, HENRY P. ADAMS, a citizen of the United States, residing at Salem, in the county of Columbiana and State of Ohio, have invented a new and useful Agricultural Implement, of which the following is a specification.

This invention relates to implements employed for improving the growth, productiveness, and vigor of plants, and has for its object to provide a simply-constructed device for distributing over growing plants and around the roots a supply of finely-divided or pulverized earth to form a mulch around the roots to retard the growth above the ground, strengthen and increase the growth beneath the ground, prevent the caking of soil, and also destroy the growth of noxious and injurious plants.

The invention consists in a means for excavating and elevating a sufficient quantity of the soil adjacent to the plants and distributing it over them, preferably in finely-divided particles.

The invention further consists in means for excavating and elevating a sufficient quantity of soil adjacent to the plants and distributing it thereto in finely-divided particles and a means for concentrating the material over a confined area of the plant rows.

The invention further consists in means for excavating and elevating a sufficient quantity of soil adjacent to the plants and distributing it thereto in finely-divided particles and a brush arranged to engage the plants after the material has been distributed to remove adhering dust from the leaves.

The invention further consists in means for excavating and elevating a sufficient quantity of soil and distributing it in finely-divided particles over the plants and a means for depressing the plants in advance of the distributing means.

The invention further consists in certain other novel features of construction, all as hereinafter shown and described, and specified in the claims following.

In the drawings illustrative of the invention, in which corresponding parts are denoted by like designating characters, Figure 1 is a sectional side elevation. Fig. 2 is a transverse section. Fig. 3 is a plan view. Fig. 4 is a perspective view of the screen-supporting frame detached.

The apparatus comprises a supporting-frame 10 of any desired form and preferably extended into thills or draft-tongue 11 or other means for applying motive power.

The device will have comparatively light draft and in its simpler form will be drawn between two rows of plants by one horse and will generally require therefor a pair of thills only to enable it to be moved.

A transverse shaft or axle 12 is connected to the frame, as by clips 13, and having centrally mounted for rotation thereon a wheel provided with a relatively wide rim 14 and spaced spokes 15, the rim being supplied with a plurality of spaced buckets or scoops 16, of sheet-steel and preferably bent into the form shown in Fig. 3. The buckets 16 will be in semicylindrical shape in transverse section and when the device is rolled over the ground will gather a percentage of the loose soil and carry it over the wheel and dump it at the upper side, and by providing means for receiving this elevated and dumped earth it can be conducted to any desired point, and to thus conduct the earth and deliver it where required is the principal object of my invention.

Attached to the frame 10 in the rear of the bucketed wheel is a gather-board or scraper-like member 17 to gather the loose soil scraped up by the bucket 16 and hold it in position to be positively fed thereto, as will be obvious by reference to Fig. 1.

Connected to the shaft 12 at each side of the bucket-wheel are standards 18 19, supporting frames 20 21 for transverse vibration, each frame spring-supported, as at 22 23, and with its inner end pointed, as at 24 25, for intermittent engagement by the spokes 15 as the wheel rotates. Screen-frames 26 27 are detachably supported upon the vibrating frames 20 21, and it will be obvious that by this arrangement when the bucket-wheel rotates the spokes 15 intermittently engaging the ends 24 25 of the frames move them outward against their springs 22 23, and when the spokes are carried past the frames the latter are thrown inward again by the reactionary force of the springs. By this means it will be obvious that the screens will be rapidly vibrated as the bucketed wheel is rotated, and being located with their inner edges beneath the opposite sides of the rims of the wheels the earth dumped from the buckets will be received by the screens, and thereby sifted in finely-divided particles upon the plants over which they pass, while the particles too coarse for the meshes of the screens will be carried over the tails of the screens and beyond the plant rows. To insure the passage of the earth to the screens in proper shape, guide-chutes 28 29 will be arranged between the screens and buckets, as shown.

Under some circumstances or when employed in connection with some species of plants it may be desirable to limit the area over which the material shall be distributed, and to provide for this contingency concentrator-chutes 30 31 will be furnished for connection beneath the frames 20 21 to receive the material and conduct it to any desired point upon the plant rows. This attachment may also be employed when a scarcity of suitable earth is available to enable the operator to economize in its use.

Depending from the forward part of the frame 10 are hangers 32 33, from which beams 34 35 extend rearwardly and are supplied with curved depressing-blades 36, operating just in advance of the screens to depress the growing plants to prevent the finely-pulverized earth from falling on the upper parts of the plants. This attachment will be employed more particularly in treating growing corn and similar plants which might be injured by sprinkling the earth among the interstices at the roots of the leaves. Means will be provided, such as threaded rods 37 38 and nuts 39 40, for adjusting the depressing-blades 36 to regulate their positions or to hold them out of action when not required. By these simple arrangements a supply of finely-divided earth may be deposited upon the plants or around their roots when required.

The device will be found especially valuable in the cultivation of sugar-beets and similar vegetation, especially in sections of country depending wholly or partially upon irrigation for the requisite moisture, as a slight coating of loose soil will effectually prevent the caking of the soil or dissolve the caking if it has taken place before the improved implement is employed. When employed over young tobacco and similar plants the leaves of which might be injured by permitting the sprinkled earth to remain, light brushes, as at 41, will be arranged in the rear of the screens to be drawn over plants of this species and remove the adhering dust and earth.

Having thus described the invention, I claim—

1. In a device of the character described, a frame carrying excavating means arranged for operative movement between rows of plants, and laterally-disposed screens for receiving the material from the excavating means, said screens having their discharge ends extending beyond the lines of plants.

2. In a device of the character described, a frame carrying excavating means and arranged for operative movement between rows of plants, screens for receiving the material from said excavating means, and means for agitating said screens, substantially as described.

3. In a device of the character described, a frame extending over rows of plants, excavating means carried by said frame for elevating earth from between said plant rows, and means for distributing the elevated earth over the plants in the rows, substantially as described.

4. In a device of the character described, the combination of a supporting-frame for movement over the ground adjacent to the plants to be treated, a wheel mounted for rotation on said frame and having curved cutting-blades spaced apart and connected transversely of its rim and extending laterally therefrom, laterally-extended chutes with their receiving ends within the rim of said wheel, and inclined screens for receiving the material from said chutes and distributing it in finely-divided condition upon the plants, substantially as described.

5. In a device of the character described, a supporting-frame, a wheel mounted for rotation on said frame, a plurality of curved cutting-blades transversely disposed upon the rim of said wheel and extending laterally therefrom, and laterally-extended chutes supported by said frame with their receiving ends within the rim of said wheel for distributing the material elevated by said blades upon the plants adjacent to the line of travel of said wheel, substantially as described.

6. In a device of the character described, a frame carrying excavating means and arranged for operative movement between rows of plants, chutes for receiving the material from said excavating means, and screens for receiving the material from said chutes and extending over the plant rows, substantially as described.

7. In a device of the character described, a frame carrying excavating means and arranged for operative movement between rows of plants, chutes for receiving the material from said excavating means, screens for receiving the material from said chutes and extending over the plant rows, and concentrator-chutes beneath said screens to receive the material and deliver it within a limited area upon the plants, substantially as described.

8. In a device of the character described, a supporting-frame, a wheel mounted for rotation on said frame, a plurality of curved cutting-blades transversely disposed upon the rim of said wheel and extending laterally therefrom, a shovel member supported in the rear of said wheel for causing the material to be engaged by said cutting-blades, and means for distributing the material elevated by said blades upon the plants, substantially as described.

9. In a device of the character described, a frame carrying excavating means and arranged for operative movement between rows of plants, means for distributing the excavated material over the plants, and plant-depressing members carried by said frame in advance of said distributing means, substantially as described.

10. In a device of the character described, the combination of a supporting-frame for movement over the ground adjacent to the plants to be treated, a wheel mounted for rotation on said frame and having curved cutting-blades spaced apart and connected transversely of its rim and extending laterally therefrom, laterally-extended chutes with their receiving ends within the rim of said wheel, screens for receiving the material from said chutes and distributing it in finely-divided condition upon the plants, and plant-depressing members carried by said frame in advance of said screens, substantially as described.

11. In a device of the character described, a frame carrying excavating means and arranged for operative movement between rows of plants, means for distributing the excavated material over the plants, and a brush operating in the rear of said distributing means for removing adhering dust from the plant-leaves, substantially as described.

12. In a device of the character described, a frame carrying excavating means and arranged for operative movement between rows of plants, screens for receiving the material from said excavating means, means for agitating said screens, and a brush connected at the rear of said screens for operation upon the leaves of the plants, substantially as described.

13. In a device of the character described, a supporting-frame, a wheel mounted for rotation on said frame, a plurality of curved cutting-blades transversely disposed upon the rim of said wheel and extending laterally therefrom, screens arranged to receive the material from said wheel and distribute it over the plants, and a brush carried in the rear of said screens, and operating upon the leaves of the plants, substantially as described.

14. In a device of the character described, a supporting-frame, a wheel mounted for rotation on said frame, a plurality of curved cutting-blades transversely disposed upon the rim of said wheel and extending laterally therefrom, screens arranged to receive the material from said wheel and distribute it over the plants, concentrator-chutes to receive the material from said screens and distribute it over a limited area of the plant rows, and a brush connected to operate upon the plants in the rear of said chutes, substantially as described.

15. In a device of the character described, a supporting-frame, a wheel mounted for rotation on said frame, a plurality of curved cutting-blades transversely disposed upon the rim of said wheel and extending laterally therefrom, screens arranged to receive the material from said wheel and distribute it over the plants, and concentrator-chutes to receive the material from said screens and distribute it over a limited area of the plant rows, substantially as described.

16. In a device of the character described, the combination of a supporting-frame for movement over the ground adjacent to the plants to be treated, a wheel mounted for rotation on said supporting-frame and having curved cutting-blades spaced apart and connected transversely of its rim and extending laterally therefrom, laterally-extended chutes with their receiving ends within the rim of said wheel, screen-frames mounted for vibration upon said supporting-frame, screens detachably supported upon said screen-frames in position to receive the material from said chutes, and means operative by said wheel for vibrating said screen-frames and the screens carried thereby, substantially as described.

17. In a device of the character described, the combination of a supporting-frame for movement over the ground adjacent to the plants to be treated, a wheel mounted for rotation on said supporting-frame and having curved cutting-blades spaced apart and connected transversely of its rim and extending laterally therefrom, laterally-extended chutes with their receiving ends within the rim of said wheel, screen-frames mounted for vibration upon said supporting-frame and spring-supported in the paths of the spokes of said wheel, screens supported detachably upon said screen-frames in position to receive the material from said chutes whereby the rotation of said wheel will cause the intermittent vibration of said screen-frames and screens, substantially as described.

18. In a device of the character described, a supporting-frame, a stationary shaft supported transversely of said frame, a wheel rotatively mounted upon said shaft and having curved cutting-blades spaced apart upon its rim and extending laterally therefrom, screen-frames supported for vibration upon said shaft and carrying detachable screens for receiving the material discharged from said cutting-blades, and means operative by said rotating wheel for vibrating said screen-frames and their screens substantially as described.

In testimony that I claim the foregoing as my own I have hereto affixed my signature in the presence of two witnesses.

HENRY P. ADAMS.

Witnesses:
　WILLIAM A. ROLLER,
　LEWIS RUHL.